US009846893B2

(12) United States Patent
Kobyakov et al.

(10) Patent No.: US 9,846,893 B2
(45) Date of Patent: Dec. 19, 2017

(54) SYSTEMS AND METHODS OF SERVING PARAMETER-DEPENDENT CONTENT TO A RESOURCE (75) Inventors: Pavel Kobyakov, Waterloo (CA); Fedor Labounko, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 340 days.

(21) Appl. No.: 14/414,372

(22) PCT Filed: Jul. 18, 2012

(86) PCT No.: PCT/UA2012/000071
§ 371 (c)(1),
(2), (4) Date: Jan. 12, 2015

(87) PCT Pub. No.: WO2014/014430
PCT Pub. Date: Jan. 23, 2014

(65) Prior Publication Data
US 2015/0220990 A1  Aug. 6, 2015

(51) Int. Cl.
*G06Q 30/02* (2012.01)
*G06F 17/22* (2006.01)
(Continued)

(52) U.S. Cl.
CPC ..... *G06Q 30/0263* (2013.01); *G06F 17/2247* (2013.01); *G06F 17/30312* (2013.01);
(Continued)

(58) Field of Classification Search
None
See application file for complete search history.

(56) References Cited

U.S. PATENT DOCUMENTS

2006/0149622 A1  7/2006 Baluja et al.
2006/0287920 A1  12/2006 Perkins et al.
(Continued)

FOREIGN PATENT DOCUMENTS

EP  2400407  12/2011
GB  2329310  3/1999
(Continued)

OTHER PUBLICATIONS

"Making Rich Media Scale" (published online at https://blog.appnexus.com/2011/rich-media/ on Aug. 1, 2011).*
(Continued)

*Primary Examiner* — James Detweiler
(74) *Attorney, Agent, or Firm* — Foley & Lardner LLP (57) ABSTRACT Methods, and systems, including computer programs encoded on computer-readable storage mediums, including a method for obtaining information about advertisement slots on resources (e.g., web pages). The method includes receiving a request to provide content for display in an ad slot of a web page presented on a user device; determining that parameter data specifying a parameter of the ad slot is not included in the request, the parameter being an indicator of a relative position of the ad slot on the web page; in response to determining that the parameter data is not included in the request, providing content to display in the ad slot to fulfill the request, the content including a tag configured to determine the parameter of the ad slot; receiving the parameter of the ad slot determined by the tag; and storing the parameter of the ad slot in a database.

13 Claims, 4 Drawing Sheets (51) Int. Cl.
*G06F 17/30* (2006.01)
*H04L 29/08* (2006.01)

(52) U.S. Cl.
CPC ... *G06F 17/30424* (2013.01); *G06Q 30/0241* (2013.01); *H04L 67/10* (2013.01)

(56) References Cited

U.S. PATENT DOCUMENTS

| | | | |
|---|---|---|---|
| 2007/0266150 A1* | 11/2007 | Lee | G06Q 30/02 709/224 |
| 2007/0266305 A1* | 11/2007 | Cong | G06Q 30/02 715/700 |
| 2008/0148383 A1 | 6/2008 | Pitchaikani et al. | |
| 2009/0100154 A1 | 4/2009 | Stevenson et al. | |
| 2009/0299862 A1* | 12/2009 | Fan | G06Q 30/0277 705/14.73 |
| 2009/0313318 A1 | 12/2009 | Dye et al. | |
| 2010/0094860 A1* | 4/2010 | Lin | G06Q 30/0277 707/709 |
| 2010/0185513 A1* | 7/2010 | Anderson | G06Q 30/02 705/14.49 |
| 2011/0029393 A1* | 2/2011 | Apprendi | G06Q 30/0277 705/14.73 |
| 2011/0137733 A1* | 6/2011 | Baird | G06Q 30/0272 705/14.68 |
| 2011/0196735 A1* | 8/2011 | von Sydow | G06Q 30/02 705/14.43 |

FOREIGN PATENT DOCUMENTS

| | | | |
|---|---|---|---|
| WO | 03/025696 | 3/2003 | |
| WO | WO 03025696 A2 * | 3/2003 | G06Q 30/02 |

OTHER PUBLICATIONS

International Search Report and Written Opinion in International Application No. PCT/UA2012/000071, dated Apr. 11, 2014, 7 pages.

* cited by examiner

SYSTEMS AND METHODS OF SERVING PARAMETER-DEPENDENT CONTENT TO A RESOURCE

BACKGROUND

In a networked environment such as the Internet, entities such as people or companies provide information for display on web pages. The web pages can include text, video, or audio information provided by the entities via a web page server for display on the Internet. Additional content such as advertisements can also be provided by third parties for display on the web pages together with the information provided by the entities. Thus, a person viewing a web page can access the information that is the subject of the web page, as well as third party advertisements that may or may not be related to the subject matter of the web page.

SUMMARY

Aspects and implementations described herein are directed to systems and methods of serving online content (e.g., advertisements) to a web page (or other electronic or online resource) based on information about parameters of the advertisement slot ("ad slot"), including, for example, an ad slot code, a unique slot id, a position on the web page/resource, a size, or a browser document size.

At least one aspect is directed toward a method of obtaining ad slot information via a computer network. The method can include receiving a request to provide content for display in an advertisement slot of a web page. A data processing system may receive this request via the computer network. The method can further include determining that parameter data specifying a parameter of the ad slot is not included in the request. The parameter is an indicator of a relative position of the ad slot on the web page or to other content on the web page. The method can further include providing the requested content to a web page server of the web page or to the requesting user device. The content can include a tag configured to execute at the web page server or the user device. The executed tag can determine at least one parameter of the advertisement slot of the web page. The method can further include storing the at least one parameter of the ad slot in a database (e.g., associated with the server). In some implementations, the method can further include selecting content based on the parameter of the advertisement slot of the web page.

At least one aspect is directed to a system for obtaining ad slot information of a computer network. The system can include an ad slot identification apparatus and an ad slot measurement apparatus. The system can be configured to receive a request to provide content for display in an ad slot of a web page. The system can be configured to determine that parameter data specifying a parameter of the ad slot is not included in the request. The system can be configured to provide, responsive to the request, content to display in an ad slot of a web page. The content can include a tag configured to execute at the web page server or user device to determine at least one parameter of the ad slot of the web page. The system can be configured to receive the at least one parameter of the ad slot. The system can include a database configured to store the at least one parameter of the ad slot. In some implementations, the system can further include selecting an advertisement for display corresponding to the at least one parameter.

At least one aspect is directed to a computer readable medium. The computer readable medium can have instructions to obtain ad slot information of a computer network. The instructions may include instructions to receive a request to provide content for display in an ad slot of a web page. The request may be received by a data processing system server via a computer network. The instructions can include instructions to determine that parameter data specifying a parameter of the ad slot is not included in the request. The instructions can include instructions to provide content to display in the advertisement slot of a web page. The content can include a tag configured to execute at the web page. The executed tag can determine at least one parameter of the advertisement slot of the web page. The instructions can include instructions to receive the at least one parameter of the advertisement slot. The at least one parameter can be received by the data processing system. The instructions can include instructions to store the at least one parameter of the advertisement slot. The parameter can be stored in a database associated with the server.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Systems and methods described herein are directed to serving online content for display on a web page that may require information about certain parameters of the advertisement slot ("ad slot") in which the content can be displayed, including, for example, ad slot code, a unique slot id, position on the web page, size, or browser document size. An ad slot may be an area of a web page or application that has been made available for displaying content. Different ad slots may represent different sections of a web page or application, or different placements for content within a single web page or application. An ad slot can display multiple types of content, including, for example, an advertisement, video, images, and text. In some implementations, the determination of whether some content (e.g., expandable content) can be properly displayed in an ad slot requires information about certain parameters of the ad slot. In the context of expandable content, content is properly displayed in an ad slot if the content can be displayed in the ad slot without being distorted (e.g., from the form in which it is intended by the content sponsor (e.g., advertiser). In the context of above the fold ads, content is properly displayed if the content is displayed above the fold. For example, an expandable ad can be properly displayed in an ad slot if the expandable ad is not clipped or otherwise distorted when the ad, in both an expanded and non-expanded state, is displayed in the ad slot.

Expandable content includes content that expands, in size, beyond the initial ad slot size on the web page. Expandable content can expand in one or more directions on the web page. In some implementations, determining whether expandable content can be, for example, properly displayed may require information about the ad slot (e.g., an expandable ad slot), such as the size of the ad slot, position of the ad slot, or the size of the web browser document. With this information, a data processing system such as a content placement server can select expandable content (e.g., an expandable ad) that can be properly displayed in the ad slot.

In some implementations, the expandable content may include an expandable advertisement. For example, if the ad slot is a horizontal ad slot on the top of the web page, then the content placement server may prevent clipping of the ad by selecting an ad that expands towards the bottom of the page instead of the top of the page. In another implementation, an advertiser may select certain criteria for their ad that requires information about one or more ad slot parameters. For example, an advertiser may want their ad to display above-the-fold (the part of the web page that is in view upon initial rendering of the web page), which may require information about the ad slot position or size, about browser document size (e.g., web page size), or some combination thereof. The size or position of an ad slot or browser document can be measured in terms of pixels or another metric (e.g., inches or centimeters).

Some types of ad slots run measuring code or script in the context of the main page (e.g., the page on which the ad slot appears) before an ad request is made and after the page has loaded. This facilitates performing measurements in real time or after a page has fully rendered, and reporting the results back to the content or an advertisement management server. Certain ad slots, such as simple advertisement slots, however, may not run such code or script at advertisement request time. Simple advertisement slots refer to any advertisement slot that does not run code or script (or the like) at advertisement request time to determine one or more parameters specifying, for example, one or more of ad slot position, ad slot size, or browser document size. Thus such ad slot parameter information is not included in the ad request for simple ad slots. For example, ad slots (e.g., simple ad slots) that may not run such code at advertisement request time may include simple JavaScript ad slots and simple iframe ad slots. Simple JavaScript ad slots may include a script tag, for example, such as:
<script src=http://adserver.com/param1=1>.

Simple iframe ad slots may include an iframe HTML element, for example, such as:
<iframe src=http://adserver.com/param1=1>.

One implementation of the systems and methods described herein can serve ad slot parameter-dependent advertisements to simple advertisement slots. For example, ad slot parameter-dependent advertisements are expandable advertisements or above-the-fold advertisements that require ad slot position or parameter data at the ad request time. This position or parameter data can, for example, be used to determine which way the advertisement can expand without being clipped, or whether the advertisement slot is currently in view in the web browser (e.g., above the fold). Simple ad slots, for example, do not provide the capability to run measuring code at the ad request time. The systems and methods disclosed herein can determine parameters of an ad slot (e.g., to determine whether content will properly display) without requiring the web page publisher to alter its web page (e.g., add parameter measuring code to its web page).

In some implementations, a data processing system such as a content placement server receives a request to fill an ad slot and determines that the ad slot is a simple advertisement slot (e.g., as ad slot parameter information is not included in the request). The content placement server can determine whether stable parameter information for that advertisement slot exists. For example, the content placement server can determine that each ad slot has a unique advertisement slot identification number, or ad slot ID. The ad slot id can identify the advertisement's parameters, including, for example, position on the web page, ad slot size, web browser document size, text color, border color, font, corner options and other style parameters. If stable parameter data exists, and the measurements indicate that the ad slot can effectively or properly display an expandable ad or an above-the-fold ad, the content placement server may provide an expandable advertisement and/or above-the-fold advertisement to the web page server. If stable parameters do not exist, an expandable or above-the-fold advertisement may not be selected, as the data processing system may have insufficient information as to whether or not expandable or above-the-fold ads can execute or properly be displayed in the ad slot. If stable parameters do not exist, and the advertisement server selects a rich media HTML advertisement for display, then a script call (e.g., script tag) can be injected into the rich media advertisement. Execution of the script tag (e.g., by a user device) can cause a web browser to determine one or more required parameters, and report the parameter data back to the advertisement server using a dedicated URL (e.g., included in the script tag). This can be repeated (e.g., through numerous ad requests and responses for the ad slot) until the parameters for the ad slot ID are determined to be stable, e.g., the advertisement slot is consistently determined to be above-the-fold, or in the upper-left corner, etc. If the parameters are stable, the content placement server can, for example, use those parameters to serve an expandable advertisement or an above-the-fold advertisement, as appropriate.

Figure 1:
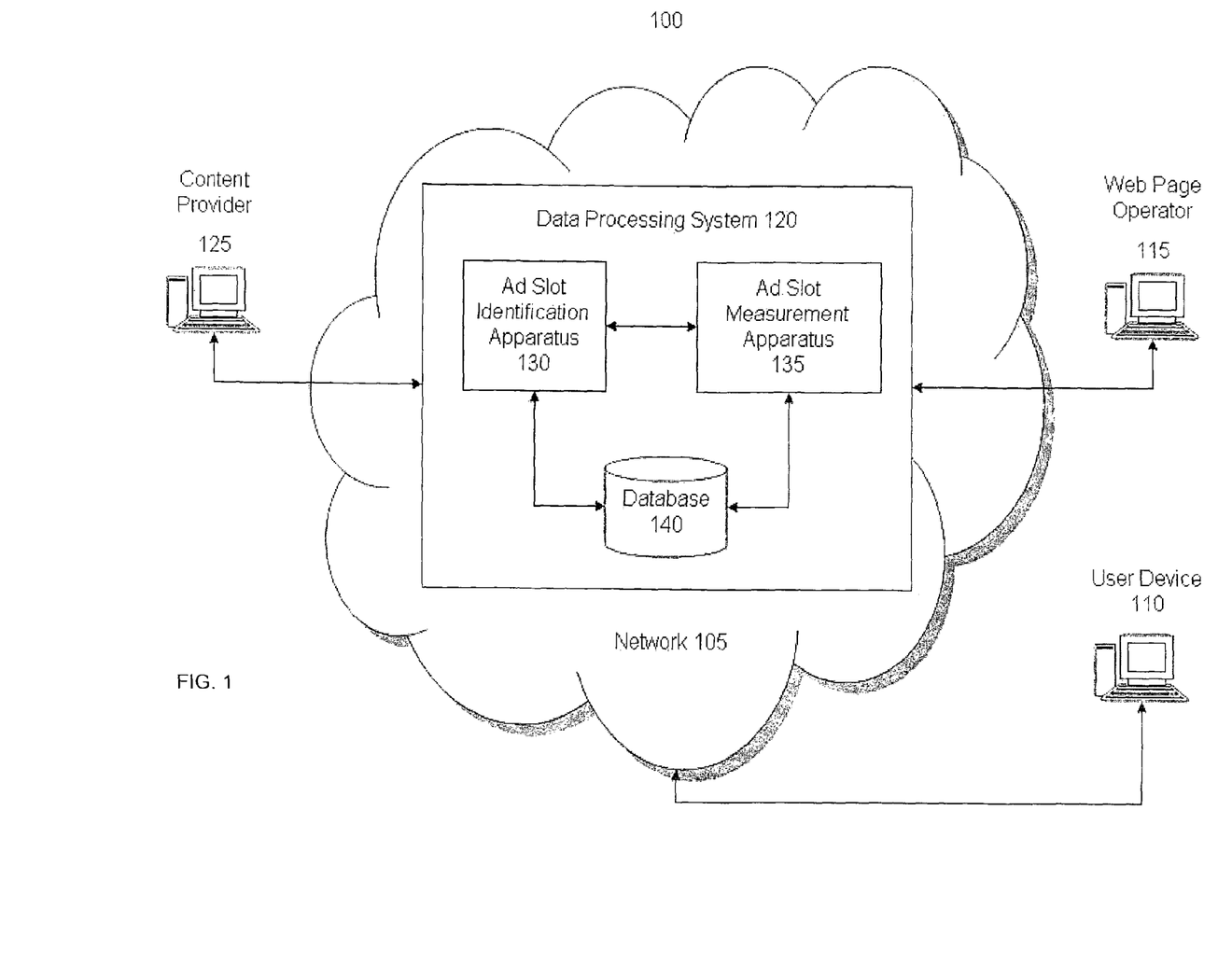
FIG. 1 is an illustration of an example system for obtaining ad slot information of a web page via a computer network, according to an illustrative implementation.

FIG. 1 illustrates an example system 100 for serving parameter-dependent content to (of for display on) a web page via a computer network such as network 105 according to an implementation of the present disclosure. The network 105 can include computer networks such as the Internet, local, metro, or wide area networks, intranets, and other communication networks such as mobile telephone networks. The network 105 can be used to access web pages that can be displayed on at least one user device 110, such as a laptop, desktop, tablet, personal digital assistants, smart phones, or portable computers. For example, via the network 105 a user of user device 110 can access web pages provided by the web page operator 115. In this example, a web browser of the user device 110 can access a web server of the web page operator 115 to retrieve a web page for display on the user device 110. The web page operator 115 generally includes an entity that operates a web page as well as the web page server that communicates with the network 105 to make the web page available to the user device 110.

The system 100 can also include at least one data processing system 120. The data processing system 120 can include at least one processor or logic device to communicate via the network 105 with at least one content provider 125 and at least one web page operator 115. The data processing system 120 can also include at least one ad slot identification apparatus (e.g., circuit) 130, at least one ad slot measurement apparatus (e.g., circuit) 135, and at least one database 140. In some implementations, the data processing system 120 includes a content placement server.

In some implementations, the web page operator 115 (or a user device 110) can request content from the data processing system 120. The data processing system 120 may further request content from the content provider 125 in response to this request for content. The data processing system 120 may select the content to provide to web page operator 115 (or the user device 110) based on numerous factors (e.g., relevancy to the subject matter of the web page with which the content will be displayed, a competitive selection process such as an auction). In another implementation, the data processing system 120 may instruct the content provider 125 to directly provide content to the web page operator 115 (or the user device 110). In some implementations, the data processing system 120 may retrieve one or more content, such as a plurality of advertisements, from content provider 125 and store the content in the database 140.

In some implementations, the data processing system 120 obtains ad slot information via the computer network 105. The ad slot may be on the web page being viewed by the user device 110. The web page may further be associated with the web page operator 115. For example, the data processing system 120 can obtain ad slot information such as at least one ad slot parameter, including, for example, a unique ad slot id, ad slot position, browser document size, or ad slot length and width.

An ad slot code is an identifier used by a data processing system 120 and/or an advertisement placement server. The ad slot code may be tied to various web operator and/or publisher settings. The unique ad slot id, on the other hand, is an id that is correlated with a certain ad slot on a certain web page. This unique ad slot id represents the ad slot the data processing system 120 is trying to gather data for. For example, the same ad slot code may be associated with ad slots that appear on multiple web pages. In one web page, the ad slot code may be associated with an ad slot on the left side of the web page, and on another web page, the ad slot code may be associated with an ad slot on the right side of the page. In these two cases, the data processing system 120 may try to determine a unique ad slot id that is different for the two different ad slots with the same ad slot code. In some implementations, the data processing system 120 may determine a unique ad slot id for the ad slot by combining the URL associated with the ad slot with the ad slot or ad slot code. In this example, the ad slot and URL combination may result in a unique ad slot id. In another implementation, the data processing system 120 may use various other parameters to generate a unique ad slot id, including, for example, the ad slot's location in the web page's DOM tree.

In some implementations, the data processing system 120 includes an interface configured to receive a request via the network 105 to provide content for display in an ad slot of a web page. The data processing system 120 may receive the request in real-time, e.g., between the time that the user device 110 requests access to a web page of the web page operator 115 and the time that the web page operator 115 displays the web page the user device 110.

In some implementations, the data processing system 120 includes at least one ad slot measurement apparatus 135. The ad slot measurement apparatus 135 can measure or otherwise obtain at least one parameter associated with the ad slot. For example, the ad slot measurement apparatus 135 can inject a tag into content that is being provided to the web page operator for display on the web page in the ad slot. In this example, the ad slot measurement apparatus 135 can append a script tag into a rich media advertisement. A rich media advertisement may include, for example, an HTML advertisement, expandable advertisement, above the fold advertisement, or other multimedia advertisements that include one or more of text, audio, still images, animation, video, or interactive content. The script tag may be, for example, a JavaScript tag. The tag can execute at the web page server of the web page (or at the user device) to determine at least one parameter of the ad slot of the web page. The parameter may include a unique ad slot id, ad slot position, browser document size, or ad slot length and width for example. In some implementations, the ad slot measurement apparatus 135 can append a script tag to HTML code for the content (e.g., rich media advertisement). An exemplary script tag is shown below:

<script src=http://exampleadserver.com/measure.js></script>

In some implementations, the ad slot measurement apparatus 135 injects the script tag into all rich media content that is being provided for display on user devices 110. In another implementation, the ad slot measurement apparatus 135 injects the script tag into a predetermined percentage of rich media content. For example, the ad slot measurement apparatus 135 may inject the script tag into two percent of the rich media content that are provided for display on a given web page or a given ad slot. This may be because the number of requests and ads served in a given time period is very large, and retrieving measurements from one or two percent of requests is sufficient to get a statistically significant sample of measurements. In another example, adding more processing requirements on a user device 110 to render and display a web page may slow the processes related to loading and interacting with the web page. For example, the script tag may be measuring all ad slots continuously, even for those for which data already exists, in order to detect possible changes in web pages, e.g., a publisher moving an ad slot from the right side of the page to the left side of the page. Thus, in some implementations, the scrip tag is injected as necessary to mitigate added unnecessary processing to a web page. For example, the script tag may be injected five percent, ten percent, fifty percent or more of the time. In another implementation, the percentage of necessary measurements per day may vary. For example, for certain web pages, the percentage may be higher due to the number of ad requests during a given time period, e.g., a day, an hour, a month. In some implementations, the ad slot measurement apparatus 135 can automatically determine how many measurements are necessary during a given time period (e.g., based on historical activity for the web page) to get statistically significant data and vary the number of measurement/requests accordingly.

In another implementation, the ad slot measurement apparatus 135 can also receive at least one parameter of the ad slot. For example, after a web page server of the web page operator 115 can execute the JavaScript tag to determine one or more parameter of the ad slot. The JavaScript tag may combine the determined parameter with other available data and report it to the ad slot measurement apparatus 135 via the network 105. For example, the ad slot measurement apparatus 135 may receive the unique ad slot id of the ad slot and position data.

The system 120 can include a database 140 that stores data about the ad slot. In some implementations, the database 140 can store the parameter(s) of the ad slot determined by the ad slot measurement apparatus 135. In another implementation, the database 140 may store the content provided by content provider 125. For example, the database 140 stores the advertisement provided to the web page operator 115. The database 140 may store the content with the injected tag.

In some implementations, the data processing system 120 includes an ad slot identification apparatus 130. The ad slot identification apparatus 130 can identify the type of ad slot that is requesting an advertisement based on the one or more parameter. For example, the ad slot identification apparatus 130 can identify whether the ad slot is a simple ad slot not capable of running a script code at the time of ad request, an expandable ad slot or an above the fold ad slot.

In some implementations, the ad slot identification apparatus 130 can identify the ad slot as being a simple ad slot, including, for example, a simple JavaScript ad slot and a simple iframe ad slot. Simple ad slots are not able to run script code at advertisement request time. In some implementations, the ad slot identification apparatus 130 can determine whether an ad slot is a simple ad slot based on the special parameters that are received as part of the ad request, on parameters that are not included with the ad request, or some combination thereof. For example, the ad request from a simple ad slot may include special parameters, such as adserver_req=special_parameter. In another implementation, an ad request from a simple ad slot may first communicate with a special server associated with simple ad slots, which then in turn communicates the data processing system 120. This communication may further include additional information such as the original page's content URL, the adserver_req=special_parameter, as well as bid prices the system should beat.

In some implementations, the ad slot identification apparatus 130 analyzes one or more parameters of the ad slot to determine whether it is capable of displaying expandable content. Expandable content includes, for example, content that expands from a display banner when a user takes an action to interact with the content, including, for example, rolling a mouse over the content to reveal a larger content space that can contain interactive content including, for example, video, coupons, data collection, gaming, and polling. In some implementations, the content is an advertisement, and the expandable content is an expandable advertisement.

In some implementations, the ad slot identification apparatus 130 may analyze the position or parameter data received for the ad slot by the ad slot measurement apparatus 135 to determine whether the ad slot is capable of supporting an expandable advertisement. Based on the position or parameter data for the ad slot, the ad slot identification apparatus 130 may determine that an ad can expand in a certain direction without being clipped. For example, the ad slot identification apparatus 130 may determine that the ad slot is positioned on the top of the page and further determine that the ad slot can expand down without clipping the ad. In some implementations, the ad slot identification apparatus 130 can authorize the ad slot to expand in accordance with the determination made by the ad slot identification apparatus 130.

In another implementation, the ad slot identification apparatus 130 may analyze one or more of the position data, browser document size data, and ad slot size data to determine whether the ad slot is an above the fold ad slot. An above the fold ad slot may, for example, be an ad slot that can currently be viewed by a user at the time the web page is initially displayed. For example, the ad slot may be an above the fold ad slot if the user can view the ad slot without scrolling across or down the web page.

In some implementations, the ad slot identification apparatus 130 can receive parameter data that includes a plurality of parameters corresponding to a unique ad slot id. In some implementations, the data processing system 120 analyzes a plurality of parameters to verify that one or more parameters are stable. For example, parameter data associated with an ad slot on a given web page may vary over multiple ad requests or from one ad request to another ad request. Parameter data may change for numerous reasons. For example, the web page operator 115 may alter the parameters associated with an ad slot for any reason. In another example, the web page operator may alter the contents of the web page, which may alter one or more ad slot parameters. In another example, the user of the user device 110 may alter the font size of the text on the web page via the user's web browser, which may alter one or more ad slot parameters.

In some implementations, the data processing system 120 determines whether the parameter data is stable by comparing like parameters received at different times. The data processing system 120 may further compare the difference between parameters with a stability threshold. In another implementation, the data processing system 120 may perform a statistical analysis to determine a stability metric for a parameter. The stability metric may be the variance of measurements of a parameter, the average difference of measurements of a parameter, mean, mode or any other metric that identifies the stability of measurements of a parameter. For example, the parameters may be the horizontal and vertical coordinates (X and Y coordinates) in pixels of the ad slot from the top left corner of the web page. The Y coordinate may be the same from one measurement of the parameter to another, whereas the X coordinate may vary by one or more pixels from one request to another. Thus, the stability metric for the Y coordinate may indicate that the parameter is stable, and the stability metric for the X coordinate may indicate that the parameter is unstable. The stability metric may indicate, for example, a range of variation, a likelihood that the next measurement of the parameter will fall within a certain range of coordinates, or a standard deviation.

The stability metric may indicate whether one or more parameters are stable enough to provide a certain type of advertisement. For example, the data processing system 120 may determine that an ad slot's vertical position is stable, while the ad slot's horizontal position varies significantly from ad request to ad request. Components of the data processing system 120 such as the ad slot identification apparatus 130 may determine that while an expandable advertisement that expands in the horizontal direction may be clipped, an expandable ad that expands toward the bottom of the page may not be clipped. Thus, the ad slot identification apparatus 130 may identify the ad slot as having ad slot parameter data that is stable enough to consistently display an expandable advertisement that expands toward the bottom of the page without being clipped.

The ad slot identification apparatus 130 can identify an ad slot's parameters as being stable enough to consistently display an above the fold ad. For example, the parameters the ad slot identification apparatus 130 can analyze the position or parameter data to determine one or more stability metrics for at least one of ad slot position, browser document size, and ad slot size (width, height). If the one or more stability metrics satisfy a stability threshold, e.g., standard deviation, variance, range, average difference, then the ad slot identification apparatus 130 may determine that the ad slot can consistently display an above the fold advertisement.

In some implementations, the web page operator 115 may request an ad for a given ad slot multiple times for display on the web page by multiple user devices 110. The ad slot measurement apparatus 135 may inject a tag into content numerous times, and receive parameters about the ad slot (e.g., from each injection) and store the parameters in the database 140. The ad slot identification apparatus 130 may analyze the stored parameters in the database 140 to make a determination about the ad slot. For example, the ad slot identification apparatus 130 may analyze each set of parameters for the ad slot to determine whether there is stable position data for the ad slot. For example, if the ad slot has requested an ad 1000 times, and for all 1000 requests, the ad slot measurement apparatus 135 received the same position coordinates for the ad slot, the ad slot identification apparatus 130 may determine that the ad slot has stable position data. Thus, if the ad slot has stable position data, the ad slot identification apparatus 130 may select a type of advertisement that depends upon stable position data.

The system 100 can include a database 140 designed and constructed to organize, store, retrieve, and transmit data. The database 140 can be configured to interact with any component of system 100, data processing system 120, ad slot identification apparatus 130, ad slot measurement circuit 135, content provider 125, web page operator 115, or user device 110.

Figure 2:
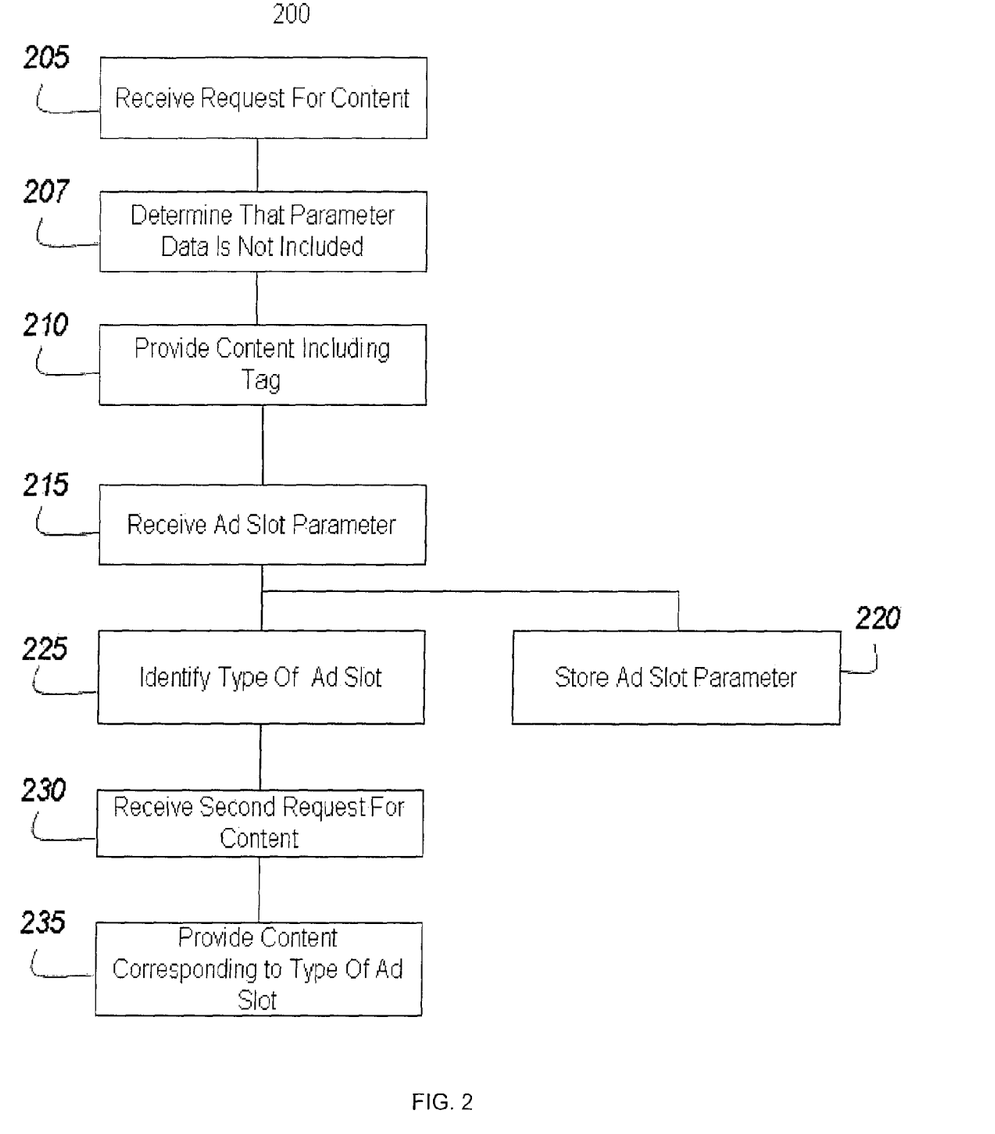
FIG. 2 is a block diagram illustrating an example method of obtaining ad slot information of a web page via a computer network, according to an illustrative implementation.

Referring now to FIG. 2, a flow diagram of a method 200 for serving parameter-dependent content to a web page via a computer network in accordance with an illustrative implementation is shown. In brief overview, the method 200 includes an act of receiving a request to provide content for an ad slot (Block 205). For example, a data processing system can receive, from a web page server, a request for content to provide together with a web page for display to a user device. Method 200 further includes determining that parameter data specifying a parameter of the ad slot is not included in the request (Block 207). The parameter is an indicator of a relative position of the ad slot on the web page. For example, the ad slot identification apparatus 130 can determine if the parameter data is included in the request. Method 200 further includes providing, responsive to the request, the content including a tag to the web page or a user device (Block 210). For example, the content may be a rich media HTML advertisement with a script tag injected or appended to the HTML code of the advertisement. The method 200 may further include receiving parameter data about the advertisement slot (Block 215). The method 200 may further include storing the parameter data in a database (Block 220). In some implementations, the method 200 includes an act of identifying the type of ad slot (Block 225). For example, the ad slot may be identified as a simple ad slot (e.g., by identifying the special parameter in the request), expandable ad slot, or an above-the-fold ad slot. In some implementations, the method 200 includes receiving a second request for content (Block 230). In some implementations, the method 200 includes an act of providing content corresponding to the type of ad slot to the web page operator or user device (Block 235).

In further detail, method 200 can include the act of receiving a request for content (Block 205). For example, the request may be sent from an entity to place content on their web page, including, e.g., a web page operator. The request may be transmitted via a network and received by a data processing system such as a content placement server. In some implementations, the content may be received from a content provider and provided to the web page operator.

In some implementations, the request for content may be responsive to one or more actions made by a user device. For example, a user device may request access to a web page hosted by a web page operator. The web page may have one or more ad slots that need content. The web page operator may request content from the system 120 that is suitable for the ad slot.

In some implementations, the request is received by an advertisement placement server. The request can also be made by the publisher of a web page. In some implementations, the request may be made in real-time, e.g., after a user requests access to a web page and prior to displaying the web page to a user. A user may be represented by an indicator for a browsing session. For example, a user may be represented by a cookie that identifies a browsing session, browser, or computing device that includes one or more processing circuits.

In another implementation, the request for content may include additional information. The request may include information about the advertisement slot. In some implementations, the information includes a unique ad slot id, data about parameters related to the advertisement slot, or data used to retrieve relevant advertisements. In some implementations, the request may lack certain data. For example, the request may lack data about parameters of the advertisement slot, including, for example, the unique advertisement slot id, parameter data, position data, or style data.

Method 200 includes an act of determining that parameter data specifying a parameter of the ad slot is not included in the request (Block 207). The parameter is an indicator of a relative position of the ad slot on the web page. The indicator can be an indication of, for example, the position of the ad slot on the web page, the size of the ad slot, the web browser document size or some combination thereof. More generally, the indicator is an indication of a layout or configuration of the web page or the ad slot. In some implementations, the ad slot identification apparatus 130 parses the request to determine if the parameter data are included in the request. For example, the ad slot identification apparatus 130 parses the request to determine if the position of the ad slot is included in the request.

In some implementations, the method 200, alternatively or in addition to determining that the parameter data is not included in the request, includes an act of identifying an ad slot as a simple ad slot (Block 207). As described above, such an ad slot that does not provide the possibility to run script code at advertisement request time. For example, simple ad slots may include simple JavaScript ad slots and simple iframe ad slots. Determining whether the ad slot is a simple ad slot may be done in numerous ways. In some implementations, Block 207 may include looking up the ad slot code of the ad request in a database that contains information about the type of ad slot. An ad slot code may be an identifier used by a data processing system or an advertisement placement server. The ad slot code may be associated with various web operator or publisher settings, including, e.g., style, color, and font size.

In some implementations, Block 207 may include analyzing one or more parameters in the ad request to determine whether the ad slot is a simple ad slot. For example, the ad request may include special parameters that indicate that the ad slot is simple ad slot. In some implementations, Block 207 may include correlating the URL of the web page or the web page operator with simple ad slots.

Method 200 includes an act of providing content including at least one tag (Block 210). For example, in response to determining that the ad request does not include the parameter data or that the ad slot is a simple ad slot for which certain parameter data does not exist (e.g., as determined from Block 207), then a rich media HTML ad (or other content) may be selected that includes a script tag (or in to which a tag is injected) to a program that is capable of executing in the browser and retrieving data about one or more ad slot parameters. The selected content can then be provided in response to the request.

In some implementations, Block 210 may include an act of selecting a rich media ad for the ad slot. The rich media advertisement may be selected based on one or more advertisement criteria received from the advertisement request. For example, Block 210 may include selecting the advertisement based on the content of the web page, including, for example, keywords associated with the web page, semantic concepts, or content verticals. In some implementations, Block 210 may include selecting the advertisement based on characteristics or past browsing behavior associated with a user device or user identifier. In some implementations, Block 210 may include selecting an advertisement for display based, at least in part, on an online advertisement bidding process. For example, online advertisers may place bids in an online auction for certain keywords. If one or more of those keywords are associated with the ad request for a web page, then the content placement server may be more likely to select an advertisement belonging to the highest bidder of one or more of those keywords. In one example, this advertisement may correspond to a rich media advertisement, including, for example, an HTML advertisement, expandable advertisement, above the fold advertisement, or other multimedia advertisements that include one or more of text, audio, still images, animation, video, or interactive content. In another example, the content placement server may select a non-rich media advertisement, e.g., an advertisement that consists of basic text.

The method 200 can include an act of injecting a tag into the content (Block 210). For example, Block 210 can include appending the tag into the HTML code of a rich media advertisement. In some implementations, Block 210 includes injecting the tag into a predetermined percentage of selected advertisements for a given web page or ad slot. For example, the tag may be injected one or two percent of all selected rich media advertisements.

In some implementations, injecting a tag may include appending the tag to the code associated with the advertisement. For example, Block 210 may include appending the tag to the end of the HTML code associated with the advertisement. In some implementations, the code may be appended or embedded to any portion of the HTML code associated with the advertisement. More generally, the tag may be linked to the HTML code in any manner such that it may be executed by the web server associated with the web page of the ad slot or the requesting user device.

In one example, Block 210 includes providing the following HTML code in response to the ad request. The first block of code corresponds to ad slot data, which may be relevant ad data that is not available in the ad request itself. This relevant data may include, for example, the slot id. The second block of code is the measuring script tag that loads the parameter measurement script.

```
<! -- ad html/js -->
<script>
AdSlotData = {
pageUrl: 'http://example.com/page.html',
slotid/slotcode: '123',
width: 728,
height: 90,
//other ad slot-related data if required.
};
</script>
<script src=http://anotherexample.com.js>
</script>
</html>
```

The tag may be a JavaScript tag configured to execute at the web page server or on the user device (e.g., a web browser on the user device executes the JavaScript tag). The tag, when executed, can determine at least one parameter of the ad slot of the web page. In this example, the "dam.js" tag may be executed to determine the ad slot position, page size, browser document size, and other required parameters. Block 210 may further include combining the data determined by the tag with other data stored in a database that is associated with this web page or ad slot.

In some implementations, the tag determines the one or more parameter by reading parameters passed from the data processing system 120. In another implementation, the tag can use a web browser document object model (DOM) manipulation API to traverse the DOM and request information, including, for example, size and location, from the standard APIs available when running in a modern browser.

Method 200 can include an act of receiving at least one ad slot parameter (Block 215). For example, Block 215 may include receiving at least one of a parameter about one or more ad slots, the web page, web browser, and user device determined at Block 210. The parameter data may be received via a URL or any other means of transmitting information from a web page operator or user device to the system 100 via a computer network 105. In some implementations, the parameter data may include one or more identifiers, including, for example, the ad slot code of the ad slot. In another implementation, the parameter data may be combined with other previously gathered data.

Method 200 includes an act of storing the ad slot parameter in at least one database (Block 220). In some implementations, the parameter can be combined with previous measurements of parameters associated with the same ad slot code and stored in the database. In some implementations, Block 220 includes storing every measurement of a parameter received for the ad slot. In some implementations, Block 220 includes combining the parameters into one or more parameter metrics. The parameter metrics may include, for example, an average parameter, standard deviation, variance, range, or any other metric that is indicative of a statistic of a parameter. For example, Block 220 can include storing the average X coordinate, instead of every measurement of the X coordinate, if the X coordinate is stable or stable enough for a parameter-dependent advertisement (e.g., exceeds a stability threshold).

Method 200 can include an act of identifying a type of ad slot (Block 225). For example, Block 225 can include evaluating the received ad slot parameter and determining that the ad slot is an expandable ad slot or an above the fold ad slot. Block 225 can include retrieving ad slot parameter data from a database. The retrieved data may correspond to one or more measurements for one or more parameters. For example, Block 225 can include the act of retrieving measurements for the X coordinate of the ad slot. Each measurement of the X coordinate of the ad slot may correspond to a measurement received and stored via method 200.

In one example, it may not be possible to retrieve ad slot parameter data because parameter data may not be stored in the database or is otherwise inaccessible. In this case, Block 225 may include triggering one or more acts included in Blocks 210, 215, and 220. For example, if there is no parameter data in the database, then the method 200 may include one or more of the acts of selecting a rich media ad for the ad slot (Block 210), injecting a tag into rich media (Block 210), providing the rich media ad for display in the ad slot (Block 210), receiving parameter data about the ad slot (Block 215), and storing the parameter data in the database (Block 220).

In another example, Block 225 may include determining that there are insufficient measurements for one or more parameters. The measurements may be insufficient if there are a fewer number of measurements than a predetermined threshold. For example, there may be 20 measurements for the X coordinate, and the predetermined threshold may be 100 measurements. In this example, the method 200 may trigger one or more acts included in method 200.

In some implementations, identifying the type of ad slot (Block 225) may include a determination that the data is stable. For example, the determination can be to determine if there are a sufficient number of measurements of a parameter, e.g., more measurements than a predetermined threshold. Measurements for a parameter, for example, received across a time span can be compared to each other to determine whether the measurements are the same or approximately the same and therefore stable in this example. The method may further compare the difference between measurements with a stability threshold. In some implementations, (Block 225) may include an act of performing a statistical analysis to determine a stability metric. The stability metric may be determined by identifying the variance of measurements of a parameter, the average difference between measurements of a parameter, or any other metric that identifies the stability or variation of measurements over time or over a number of measurements. For example, the parameters may be the horizontal and vertical coordinates (X and Y coordinates) in pixels of the ad slot from the top left corner of the web page. The Y coordinate may be the same from one measurement to another, whereas the X coordinate may vary by one or more pixels from one request to another. Thus, the stability metric for the Y coordinate may indicate that measurements of the parameter are stable, and the stability metric for the X coordinate may indicate that the measurements of the parameter are unstable. The stability metric may indicate, for example, a range of variation, a likelihood that the next measurement of the parameter will fall within a certain range of coordinates, or a standard deviation.

The stability metric may indicate whether the measurements for one or more parameters are stable enough to provide a certain type of advertisement. For example, the method 200 may include an act of determining that an ad slot's vertical position is stable, while the ad slot's horizontal position varies significantly from ad request to ad request (Block 225). The method 200 may determine that while an expandable advertisement that expands in the horizontal direction may be clipped, an expandable ad that expands towards the bottom of the page may not be clipped. Thus, the method 200 may include identifying the ad slot as having ad slot parameter data that is stable enough to consistently display an expandable advertisement that expands toward the bottom of the page without being clipped.

Similarly, ad slot identification (Block 225) may include the act of identifying the measurements of a parameter of an ad slot as being stable enough to consistently display an above the fold ad. For example, Block 225 may include analyzing parameters, including, for example, the browser document size, and size (width, height) of the ad slot to determine one or more stability metrics. If the one or more stability metrics, e.g., standard deviation, variance, range, average difference, satisfy a stability threshold, then the method may include the act of determining that ad slot can consistently display an above the fold advertisement.

In some implementations, Block 225 may include determining that the parameter data for one or more parameters is not stable enough to display a parameter-dependent advertisement. In this example, the method 200 may then implement one or more of the acts of selecting a rich media ad for the ad slot (Block 210), injecting a tag into rich media (Block 210), providing the rich media ad including the tag for display on the ad slot (Block 210), receiving parameter data about the ad slot (Block 210), and storing the parameter data in the database (Block 220). In another example, ad slot identification (Block 225) may include a determination that there is insufficient parameter data on one or more parameters. Parameter data may be insufficient if there are a fewer number of measurements than a predetermined threshold. For example, there may be 20 measurements for the X coordinate, and the predetermined threshold may be 100 measurements. In this example, the method 200 may proceed to implement one or more acts included in method 200, such as, in response to a request for content (Block 205), providing additional tagged content (Block 210) and receiving additional ad slot parameters (e.g., additional measurements of ad slot parameters) (Block 215).

Method 200 includes an act of receiving a second request for content (Block 230). For example, the second request may be caused by a user of the user device upon viewing a web page provided by the web page operator. The second request may be received by the data processing system. The second request may be for content, including, for example, an advertisement, to be displayed on a web page. The second request may be made from the same web page as the first request. The second request may further be for the same ad slot as the first request. In some implementations, the second request follows the first request (e.g., the second request may be subsequent to the first request). In some implementations, there may be many other requests for content made by the web page operator between the first request and the second request.

Method 200 includes an act of providing content corresponding to the identified type of ad slot (Block 235). For example, Block 235 may include the act of providing content corresponding to parameter data in response to a second request for content (Block 235). For example, at the time of a first ad request (Block 205), content capable of measuring one or more parameters of the ad slot or web page may have been provided. Upon receiving the measurement data (Block 215) and identifying the ad slot as capable of displaying an expandable ad or an above the fold ad (Block 225), an expandable ad or an above the fold ad, as appropriate, can be provided in response to a second ad request (Block 235).

In some implementations, Block 235 may include the act of identifying the type of ad slot and then providing an advertisement corresponding to the type of ad slot for display on the web page. For example, the method may include the act of determining that the ad slot can support an expandable advertisement and/or an above the fold advertisement, and then providing an expandable advertisement or an above the fold advertisement.

In some implementations, Block 235 includes the act of filtering out advertisements based on the parameter data. For example, there may not be sufficient parameter data or the parameter data may not be stable enough to provide an ad slot parameter-dependent advertisement (e.g., an expandable ad or an above the fold ad) to the ad slot. In this case, Block 235 may include the act of preventing an ad slot parameter-dependent advertisement from being provided to the ad slot. For example, if the ad slot cannot display an expandable advertisement without it being clipped, then Block 235 may include the act of preventing any expandable ads from being selected for display on the ad slot.

In some implementations, Block 235 can include the act of selecting a parameter-dependent advertisement based on an advertisement targeting criteria. Ad targeting criteria may include, e.g., interest categories, demographics, geography, semantic concepts, or content verticals. Ad criteria may further include the type of ad slot. In some implementations, Block 235 can include the act of a content provider targeting their content to an ad slot that has a parameter corresponding to a certain type of ad. For example, an advertiser may target their advertisements to ad slots that have parameters corresponding to a certain type of ad. The advertiser may target ad slots that are capable of showing expandable advertisements by bidding on expandable ad slots and selecting to have their advertisement displayed on an expandable advertisement. In another example, an advertiser may target above the fold ad slots by bidding on above the fold ad slots and having their advertisements displayed on an above the fold ad slot.

Although this description has focused on determining parameter information related to an ad slot on a web page, the systems and methods described herein can also be applied to ad slots on other types of resources. Such other resources can include, for example, online content such as games, videos and images to name a few.

Figure 3:
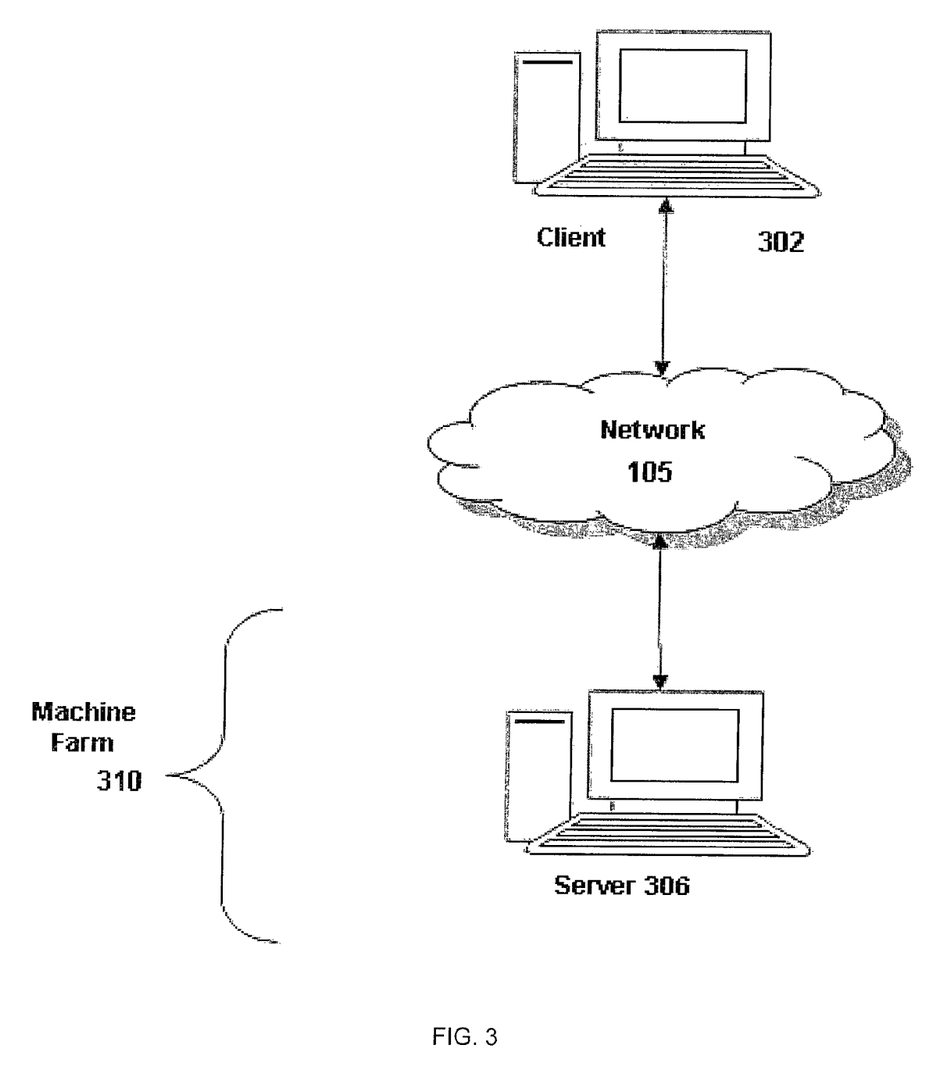
FIG. 3 shows an illustration of an example network environment comprising client machines in communication with remote machines in accordance with an illustrative implementation.

The system 100 and its components may include hardware elements, such as one or more processors, logic devices, or circuits. Referring to FIG. 3, an implementation of a network environment 300 is depicted. The system 100 and method 200 can operate in the network environment 300 depicted in FIG. 4. In brief overview, the network environment 300 includes one or more clients 302 that can be referred to as local machine(s) 302, client(s) 302, client node(s) 302, client machine(s) 302, client computer(s) 302, client device(s) 302, endpoint(s) 302, or endpoint node(s) 302) in communication with one or more servers 306 that can be referred to as server(s) 306, node 306, or remote machine(s) 306) via one or more networks 105. In some implementations, a client 302 has the capacity to function as both a client node seeking access to resources provided by a server and as a server providing access to hosted resources for other clients 302.

Although FIG. 3 shows a network 105 between the clients 302 and the servers 306, the clients 302 and the servers 306 may be on the same network 105. The network 105 can be a local-area network (LAN), such as a company Intranet, a metropolitan area network (MAN), or a wide area network (WAN), such as the Internet or the World Wide Web. In some implementations, there are multiple networks 105 between the clients 105 and the servers 306. In one of these implementations, the network 105 may be a public network, a private network, or may include combinations of public and private networks.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 105 may include a wireless link, such as an infrared channel or satellite band. The topology of the network 105 may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some implementations, different types of data may be transmitted via different protocols. In other implementations, the same types of data may be transmitted via different protocols.

In some implementations, the system 100 may include multiple, logically-grouped servers 306. In one of these implementations, the logical group of servers may be referred to as a server farm 310 or a machine farm 310. In another of these implementations, the servers 306 may be geographically dispersed. In other implementations, a machine farm 310 may be administered as a single entity. In still other implementations, the machine farm 310 includes a plurality of machine farms 310. The servers 306 within each machine farm 310 can be heterogeneous—one or more of the servers 306 or machines 306 can operate according to one type of operating system platform.

In some implementations, servers 306 in the machine farm 310 may be stored in high-density rack systems, along with associated storage systems, and located in an enterprise data center. In this implementation, consolidating the servers 306 in this way may improve system manageability, data security, the physical security of the system, and system performance by locating servers 306 and high performance storage systems on localized high performance networks. Centralizing the servers 306 and storage systems and coupling them with advanced system management tools allows more efficient use of server resources.

The servers 306 of each machine farm 310 do not need to be physically proximate to another server 306 in the same machine farm 310. Thus, the group of servers 306 logically grouped as a machine farm 310 may be interconnected using a wide-area network (WAN) connection or a metropolitan-area network (MAN) connection. For example, a machine farm 310 may include servers 306 physically located in different continents or different regions of a continent, country, state, city, campus, or room. Data transmission speeds between servers 306 in the machine farm 310 can be increased if the servers 306 are connected using a local-area network (LAN) connection or some form of direct connection. Additionally, a heterogeneous machine farm 310 may include one or more servers 306 operating according to a type of operating system, while one or more other servers 306 execute one or more types of hypervisors rather than operating systems. In these implementations, hypervisors may be used to emulate virtual hardware, partition physical hardware, virtualize physical hardware, and execute virtual machines that provide access to computing environments.

Management of the machine farm 310 may be de-centralized. For example, one or more servers 306 may comprise components, subsystems and modules to support one or more management services for the machine farm 310. In one of these implementations, one or more servers 306 provide functionality for management of dynamic data, including techniques for handling failover, data replication, and increasing the robustness of the machine farm 310. Each server 306 may communicate with a persistent store and, in some implementations, with a dynamic store.

Server 306 may include a file server, application server, web server, proxy server, appliance, network appliance, gateway, gateway, gateway server, virtualization server, deployment server, secure sockets layer virtual private network ("SSL VPN") server, or firewall. In some implementations, the server 306 may be referred to as a remote machine or a node.

The client 302 and server 306 may be deployed as or executed on any type and form of computing device, such as a computer, network device or appliance capable of communicating on any type and form of network and performing the operations described herein.

Figure 4:
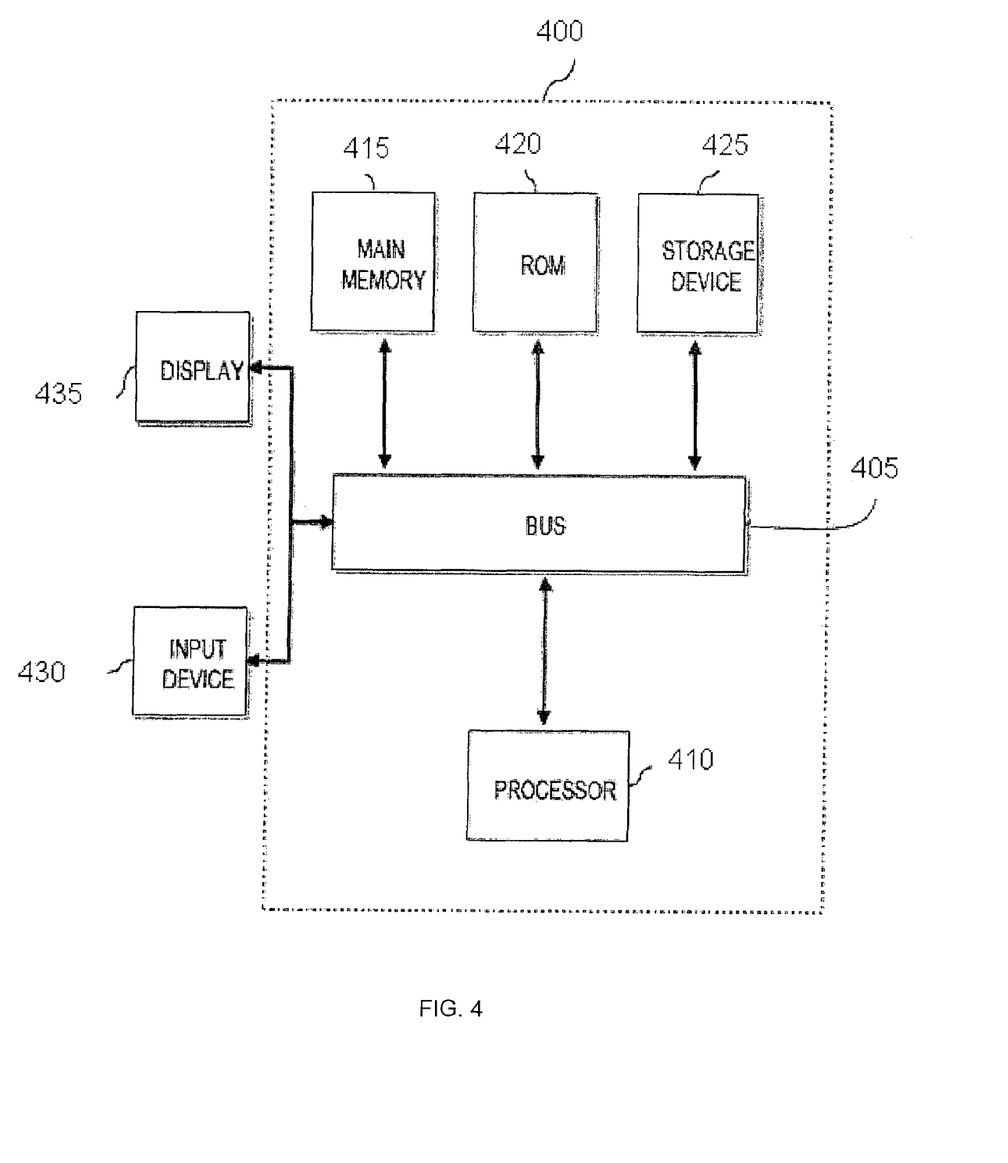
FIG. 4 is a block diagram illustrating a general architecture for a computer system that may be employed to implement various elements of the systems shown in FIGS. 1 and 3, and the method shown in FIG. 2, in accordance with an implementation.

FIG. 4 is a block diagram of a computer system 400 in accordance with an illustrative implementation. The computer system or computing device 400 can be used to implement the system 100, user device 110, web page operator 115, data processing system 120, content provider 125, ad slot identification apparatus 130, ad slot measurement apparatus 135, and database 140. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 410 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. In another implementation, the input device 430 has a touch screen display 435. The input device 430 can include a cursor control, such as a mouse, a trackball, or cursor direction keys, for communicating direction information and command selections to the processor 410 and for controlling cursor movement on the display 435.

According to various implementations, the processes described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an example computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. A computer storage medium is not a propagated signal and does not include transitory signals. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of obtaining ad slot information via a computer network, comprising:
   receiving, by a data processing system via the computer network, a first request to provide content for display in an ad slot of a web page presented on a client device, the first request including an slot identifier (ID) of the ad slot;
   determining, by the data processing system that a relative position parameter of the ad slot is not inducted in the first request and is not stored in a database of the data processing system, the relative position parameter being an indicator of a relative position of the ad slot on the web page and including at least one of a position of the ad slot in the web page and a size of the ad slot;
   in response to determining that the relative position parameter is not included in the first request and is not stored in the database, providing content to display in the ad slot to fulfill the first request, the content including a tag configured to execute on the client device and cause the client device to (i) determine the relative position parameter of the ad slot of the web page and ii) transmit the determined relative position parameter to the data processing system;
   receiving, by the data processing system, the relative position parameter of the ad slot determined by the tag;
   storing, by the data processing system, the relative position parameter of the ad slot in association with the ad slot ID within the database;

receiving, by the data processing system via the computer network, a second request to provide content for display in the ad slot, the second request including the ad slot ID;
determining by the data processing system, that the relative position parameter of the ad slot is not included in the second request and is stored in the database;
in response to determining that the relative position parameter is not included in the second request and is stored in the database, determining, by the data processing system using the ad slot ID, that the ad slot is configured to display expandable content items based on the relative position parameter stored in the database;
selecting, by the data processing system, an expandable content item for display in the ad slot based on the determination that the ad slot is configured to display expandable content items; and
providing, by the data processing system via the computer network, the selected expandable content item for display in the ad slot.

2. The method of claim 1, wherein providing content comprises: selecting, by the data processing system, content for display in the ad slot to fulfill the first request, wherein the content is a rich media advertisement: and
injecting, by the data processing system, tag into the content.

3. The method of claim 1, further comprising: selecting, by the data, processing system, the content based on an advertisement targeting criteria.

4. The method of claim 1, further comprising: identifying, by the data processing system, a direction on the web page in which the ad slot can expand based at least in part on the stored relative position parameter.

5. The method of claim 1, wherein receiving the relative position parameter of the ad slot further comprises: receiving, by the data processing system, a plurality of measurements corresponding to the ad slot ID of the ad slot;
obtaining, by the data processing system, a stability metric based on the plurality of measurements; and
comparing, by the data processing system, the stability metric with a stability threshold to identify the ad slot as a stable ad slot.

6. The method of claim 1, wherein the content includes an HTML rich media ad and the tag includes a script.

7. The method of claim 1, further comprising receiving, by the data processing system, an indication of an ad slot code.

8. A system, comprising:
a database;
one or more hardware data processors; and
a memory storing instructions thereon, the instructions when executed by the one or more hardware data processors cause the one or more hardware data processors to perform operations comprising:
receive, via a computer network, a first request to provide content for display in an ad slot of a web page presented on a client device, the first request including an slot identifier (ID) of the ad slot;
determine that a relative position parameter of the ad slot is not included in the first request and is not stored in the database, the relative position parameter being an indicator of a relative position of the ad slot on the web page and including at least one of a position of the ad slot in the web page and a size of the ad slot;
in response to determining that the relative position relative position parameter is not included in the first request and is not stored in the database provide, responsive to the first request, content to display in the ad slot, wherein the content includes a tag configured to execute on the client device and cause the client device to (i) determine the relative position parameter of the ad slot of the web page and ii) transmit the determined relative position parameter to the system;
receive the relative position parameter of the ad slot determined by the tag;
store the relative position parameter of the ad slot in association with ad slot ID within the database;
receive, via the computer network, a second request to provide content for display in the ad slot, the second request including the ad slot ID;
determine that the relative position parameter of the ad slot is not included in the second request and is stored in the database;
in response to determining that the relative position parameter is not included in the second request and is stored in the database, determine, using the ad slot ID, that the ad slot is configured to display expandable content items based on the relative position parameter stored in the database;
select an expandable content item for display in the ad slot based on the determination that the ad slot is configured to display expandable content items;
and provide, via the computer network, the selected expandable content item for display in the ad slot.

9. The system of claim 8, wherein providing content comprises: select a rich media advertisement for the ad slot to fulfill the first request; and
inject the tag into the rich media advertisement.

10. The system of claim 8 wherein the instructions, when executed by the one or more hardware data processors, cause the one or more hardware data processors to perform further operations comprising: receive a plurality of measurements corresponding to the ad slot ID of the ad slot;
obtain a stability metric based on the plurality of measurements; and
compare the stability metric with a stability threshold to identify the ad slot as stable.

11. A non-transitory computer readable medium having instructions to obtain ad slot information of an ad slot of a web page configured for display via a computer network, the instructions comprising instructions, which, when executed by one or more data processors, cause the one or more data processors to perform operations comprising;
receive, via the computer network, a first request to provide content for display in the ad slot of the web page presented on a client device, the first request including an slot identifier (ID) of the ad slot;
determine that a relative position parameter of the ad slot is not included in the first request and is not stored in a database, the relative position parameter being an indicator of a relative position of the ad slot on the web page and including at least one of a position of the ad slot in the web page and a size of the ad slot;
in response to determining that the relative position parameter is not included in the first request and is not stored in the database, provide content to display in the ad slot, the content including a tag configured to execute on the client device and cause the client device to (i) determine the relative position parameter of the ad slot of the web page and ii) transmit the determined relative position parameter to a server;

receive the relative position parameter of the ad slot determined by the tag;

store the relative position parameter of the ad slot in the database;

receive, via the computer network, a second request to provide content for display in the ad slot, the second request including the ad slot ID;

determine that the relative position parameter of the ad slot is not included in the second request and is stored in the database;

in response to determining that the relative position parameter is not included in the second request and is stored in the database, determine, using the ad slot ID, that the ad slot is configured to display expandable content items based on the relative position parameter stored in the database;

select an expandable content item for display in the ad slot based on the determination that the ad slot is configured to display expandable content items; and provide, via the computer network, the selected expandable content item for display in the ad slot.

12. The non-transitory computer readable medium of claim 11, wherein providing content comprises: select a rich media advertisement for the ad slot to fulfill the first request;

inject the tag into the rich media advertisement;

provide the rich media advertisement with the tag; and receive the relative, position parameter including measurement data about the ad slot.

13. The non-transitory computer readable medium of claim 11, further comprising instructions to: receive measurement data comprising a plurality of measurements corresponding to the ad slot ID of the ad slot;

obtain a stability metric based on the plurality of measurements;

and compare the stability metric with a stability threshold to identifying the ad slot as a stable ad slot.

* * * * *